US006839320B2

United States Patent
Paridaens et al.

(10) Patent No.: US 6,839,320 B2
(45) Date of Patent: Jan. 4, 2005

(54) PERFORMING AUTHENTICATION OVER LABEL DISTRIBUTION PROTOCOL (LDP) SIGNALING CHANNELS

(75) Inventors: Olivier Paridaens, Brussels (BE); Peter Paul Camille De Schrijver, Heverlee (BE); Yves Robert Fernand T'Joens, Sint-Michiels-Brugge (BE)

(73) Assignee: Alcatel, Paris (FR)

( * ) Notice: Subject to any disclaimer, the term of this patent is extended or adjusted under 35 U.S.C. 154(b) by 816 days.

(21) Appl. No.: 09/801,696

(22) Filed: Mar. 9, 2001

(65) Prior Publication Data

US 2002/0007412 A1 Jan. 17, 2002

(30) Foreign Application Priority Data

Mar. 6, 2001 (EP) .............................. 00400658
Mar. 6, 2001 (EP) .............................. 01400572

(51) Int. Cl.[7] .............................................. G01R 31/08
(52) U.S. Cl. ....................... 370/230; 379/389; 380/258; 713/201
(58) Field of Search .................. 379/230, 235, 379/261, 351–3, 389, 395.1, 395.2, 431, 438, 522; 709/227–9, 237; 711/216; 380/256, 257, 258, 277–285; 705/44; 713/200, 201, 202

(56) References Cited

U.S. PATENT DOCUMENTS

| 5,933,784 A | 8/1999 | Gallagher et al. |
| 2002/0052915 A1 * | 5/2002 | Amin-Salehi ................ 709/203 |
| 2002/0109879 A1 * | 8/2002 | Wing So ..................... 359/118 |
| 2002/0120720 A1 * | 8/2002 | Moir .......................... 709/220 |
| 2003/0035411 A1 * | 2/2003 | Moy et al. ................... 370/352 |

FOREIGN PATENT DOCUMENTS

| EP | 0 977 457 A2 | 2/2000 |
| WO | WO 99/30460 | 6/1999 |

OTHER PUBLICATIONS

Muneyoshi Suzuki: "The assignment of the Information Field and Protocol Identifier in the Q.2941 Generic Identifier and Q.2957 User–to–User Signaling for the Internet Protocol" Network Working Group, Jan. 11, 2000.

Jeremy Declercq, Olivier Paridaens, and Yves T'Joens: "End to End Authentication for LDP" Internet Draft, Nov. 27, 2000, pp. 1–13.

* cited by examiner

Primary Examiner—David Vincent
(74) Attorney, Agent, or Firm—Sughrue Mion, PLLC

(57) ABSTRACT

To perform end-to-end authentication between a customer premises network termination (CPNT1) of a user and a network access server (NAS1) of a service provider at set-up of a label switched connection in a label switched data packet system, end-to-end authentication information is transported over label distribution signaling channels.

13 Claims, 3 Drawing Sheets

US 6,839,320 B2

PERFORMING AUTHENTICATION OVER LABEL DISTRIBUTION PROTOCOL (LDP) SIGNALING CHANNELS

BACKGROUND OF THE INVENTION

The present invention relates to a method to perform end-to-end authentication between a customer premises network termination and a network access server as defined in the non-characteristic part of claim 1, a customer premises network termination as defined in the non-characteristic part of claim 6, and a network access server as defined in the non-characteristic part of claim 10.

End-to-end authentication, i.e. authentication between a customer premises network termination and a network access server, in an MPLS (Multi Protocol Label Switching) based broadband internet access network can be implemented straightforwardly by encapsulating the data packets, for instance IP (Internet Protocol) packets into PPP (Point to Point Protocol) frames and by transporting the PPP (Point to Point Protocol) frames over MPLS. The end-to-end authentication functionality of PPP (Pont to Point Protocol) is then used to authenticate the customer premises network termination to the network access server. End-to-end authentication mechanisms of PPP (Point to Point Protocol) are described for instance in the *IETF RFC (Request for Comments)* 1334 entitled *'PPP Authentication Protocols'* and authored by B. Lloyd and W. Simpson.

The just described straightforward implementation of end-to-end authentication in an MPLS (Multi Protocol Label Switching) based access network requires that the encapsulation format for PPP over MPLS is defined in order to have a standard way of carrying the additional protocol, i.e. the PPP frames, over MPLS. In addition thereto, the MPLS/LDP (Label Distribution Protocol) has to be enhanced to be able to signal the new type of traffic, i.e. the PPP frames that will be carried. Furthermore, even if the PPP over MPLS encapsulation format would be standardised and even if the MPLS/LDP would be enhanced accordingly, the straightforward implementation uses an additional protocol, i.e. the PPP protocol, only for authentication and this solution therefore significantly increases the overhead and complicates traffic management because an additional layer is inserted in the protocol stack.

SUMMARY OF THE INVENTION

An object of the present invention is to provide a method for end-to-end authentication and to provide network elements able to perform this method, but which do not increase the overhead and which do not complicate traffic management.

According to the present invention, this object is achieved by the method to perform end-to-end authentication defined by claim 1, the customer premises network termination defined by claim 6, and the network access server defined by claim 10.

Indeed, by transporting end-to-end authentication information over the label distribution signalling channels, all end-to-end authentication functionality is provided by the signalling protocol, e.g. MPLS/LDP. There is no need to carry PPP frames over the data channels so that for instance IP (Internet Protocol) packets can be carried directly over MPLS. This reduces the overhead and enables faster connection set-up. Since the protocol stack contains less layers in comparison with the above described straightforward PPP over MPLS solution, traffic management is eased.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional, optional feature of the method for end-to-end authentication according to the present invention, is defined by claim 2.

Thus, in an MPLS (Multi Protocol Label Switching) based access network the present invention can be implemented by transporting all end-to-end authentication information in LDP (Label Distribution Protocol) messages.

Additional features of a first embodiment of the present invention are defined by claims 3, 7 and 11.

Thus, in this first embodiment, the end-to-end authentication information consists of the PPP CHAP (Challenge Handshake Protocol) information which is piggybacked on the label distribution channels. This implementation requires LDP (Label Distribution Protocol) to be enhanced to be able to carry a challenge request message, a challenge response message, an encrypted challenge request message, and an authentication success/authentication failure message.

Additional features of a second embodiment of the present invention are defined by claims 4, 8 and 12.

Thus, in this second embodiment, digital certificates and digital signatures are used. A digital certificate is an object containing the user identity and a public key signed by a trusted authority. A private key, only known to the user, is connected to the public key. A digital signature consists of a secure hash value (obtained by using a secure hash function on the message content) encrypted using the private key. The digital signature can be used to prove the message integrity and the senders identity by the network access server and vice versa. This second implementation requires LDP (Label Distribution Protocol) to be enhanced to be able to carry a request message with digital signature, and an authentication success/authentication failure message.

Additional features of a third preferred embodiment of the present invention are defined by claims 5, 9 and 13.

In this way, a more bandwidth efficient implementation of the present invention than e.g. the above mentioned first implementation is provided. The message authentication code authenticates the client to the network access server and is based on a secret s shared between the client and the service provider, as well as a nonce n which is a unique value such as a time stamp that avoids that the message is captured and later on used by a violating person. This third implementation requires LDP (Label Distribution Protocol) to be enhanced to be able to carry an authentication request and an authentication success/authentication failure message, and requires minimum bandwidth on the signaling channels to be occupied by authentication information.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
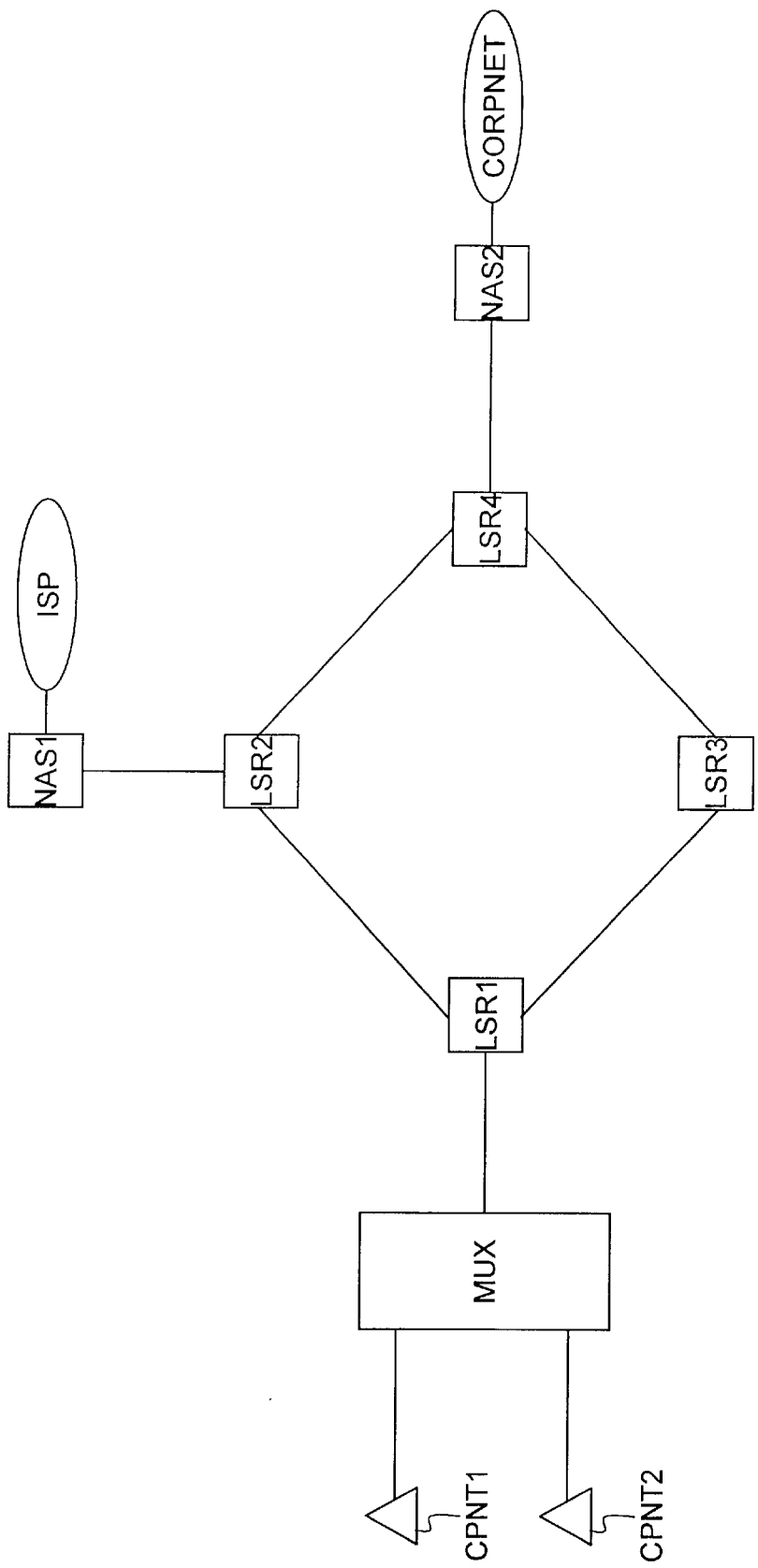
FIG. 1 depicts a label switched communication system wherein different embodiments of the end-to-end authentication method according to the present invention may be applied.

The label switched communication system of FIG. 1 contains: a first customer premises network termination CPNT1 and a second customer premises network termination CPNT2, which may for instance be ADSL (Asymmetric Digital Subscriber Line) modems, VDSL (Very High Speed Digital Subscriber Line) cable modems, optical network terminations, or the like; an access multiplexer MUX which may for instance be a DSLAM (Digital Subscriber Line Access Multiplexer); a first label switch router LSR1, a second label switch router LSR2, a third label switch router LSR3 and a fourth label switch router LSR4, which may for instance be MPLS (Multi Protocol Label Switched) Internet routers; a first network access server NAS1 and a second network access server NAS2, to which may be connected for instance a video on demand server, an audio server, a bank transaction server, and so on; and internet service provider equipment ISP such as for instance a video database and a video on demand controller, and a corporate network CORPNET, e.g. a LAN (local access network) privately owned by a company.

The first and second customer premises network terminations, CPNT1 and CPNT2, are coupled via the access multiplexer MUX to the first label switch router LSR1. This first label switch router LSR1 is connected to the second label switch router LSR2 as well as to the third label switch router LSR3. The second label switch router LSR2 and the third label switch router LSR3 are further connected to the fourth label switch router LSR4. The internet service provider equipment ISP is coupled via the first network access server NAS1 to the second label switch router LSR2. Similarly, the corporate network CORPNET is coupled via the second network access server NAS2 to the fourth label switch router LSR4.

The Internet access network drawn in FIG. 1 is operated by an access network provider. The connectivity between the label switch routers LSR1, LSR2, LSR3 and LSR4 may be by means of ATM (Asynchronous Transfer Mode) or another link layer technology such as Ethernet or packet over SONET/SDH (Synchronous Digital Hierarchy). The access network configuration drawn in FIG. 1 provides access to various network service providers, e.g. a small Internet service provider, a big Internet service provider, or a corporate network. The link used to connect the network service providers ISP and CORPNET to the access network scales with the operational prospects of the network service provider. The aim of the network service providers is to sell access to the Internet service provider equipment ISP or to sell corporate networks CORPNET in a VPN (Virtual Private Network) like way. The customer premises network terminations in the remainder of this patent application are supposed to be ADSL (Asymmetric Digital Subscriber Line) modems that can be bought by retail and it is supposed that the drawn access network is ADSL based. The network architecture is supposed to be such that autoconfiguration of the ADSL (Asymmetric Digital Subscriber Line) modems is performed. When turned on after installation (i.e. after connection to the user's PC and to the copper telephone line), the ADSL modem CPNT1 requests a private IP (Internet Protocol) address in order to be able to communicate with the access network. To that end, a discover message is issued over a predetermined VC (Virtual Channel) towards the access multiplexer MUX. The predetermined VC will be the fixed control VC over which private IP (Internet protocol) traffic will flow but will at no time carry any user traffic. The access multiplexer MUX either terminates this predetermined VC itself or may wish to have a co-located server terminating this predetermined VC. It is assumed that the access multiplexer of FIG. 1 terminates the predetermined VC itself. The access multiplexer MUX forwards the request for a private IP address to a configuration server, not shown in FIG. 1. Along with the requested private IP address, the ADSL modem CPNT1 will get the address of the configuration server. The configuration server for instance can be used to automatically upload the newest version of the ADSL operating system amongst other information. The network management console of the access network provider is contacted to be informed on the booting of the ADSL modem CPNT1 from the specific customer premises where the ADSL modem CPNT1 is located. The service offered by the access network provider is label switched connectivity, that can be used to support any packet based user service traffic. The ADSL modem CPNT1 can run in an always-on scenario or in a dial-in scenario. Partial authentication of the user may be performed at the modem. This would allow the user to type in a structured user name on log-in. Thereupon, the fully qualified domain name can be used to perform a DNS (Domain Name Service) query to the DNS server of the access network. This DNS server then returns the IP (Internet Protocol) address of the network access server NAS1 of the network service provider selected by the user of the ADSL modem CPNT1, and a label switched path will be established to this network access server NAS1. A variant of the just described scheme could be where the access multiplexer MUX instead of the ADSL modem CPNT1 performs partial authentication of the user.

It is noticed that a label switched path establishment request issued by the ADSL modem CPNT1 can be policed by the access multiplexer MUX. To that end, the access multiplexer MUX would communicate with a policy server, also not drawn in FIG. 1, of the access network. In this way, access from the customer premises to only one single corporate network at a time could be policed.

It is evident that the number of service provisioning scenario's and policies applicable is only bound by the imagination of the network architect. The provisioning of VoIP (Voice over Internet Protocol) service can for example be offered by providing automated access to a network access server with voice gateway functionality. The label switched path established that way may carry either PPP (Point to Point Protocol) or native IP (Internet Protocol) packets.

Figure 3:
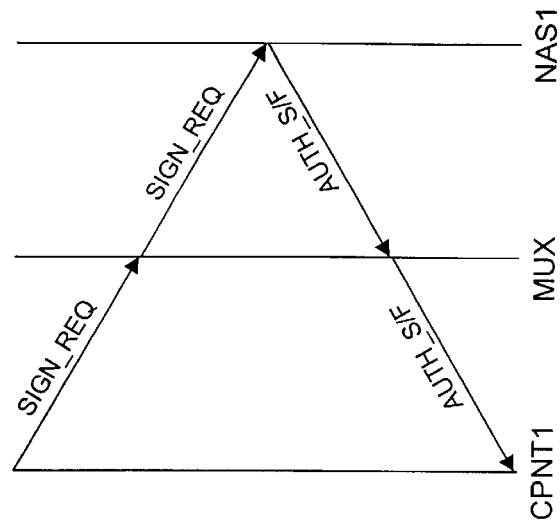
FIG. 3 is a time diagram for the transfer of label distribution protocol messages between the customer premises network termination CPNT1 and the network access server NAS1 of FIG. 1 when a second embodiment of the end-to-end authentication method according to the present invention is implemented.
Figure 2:
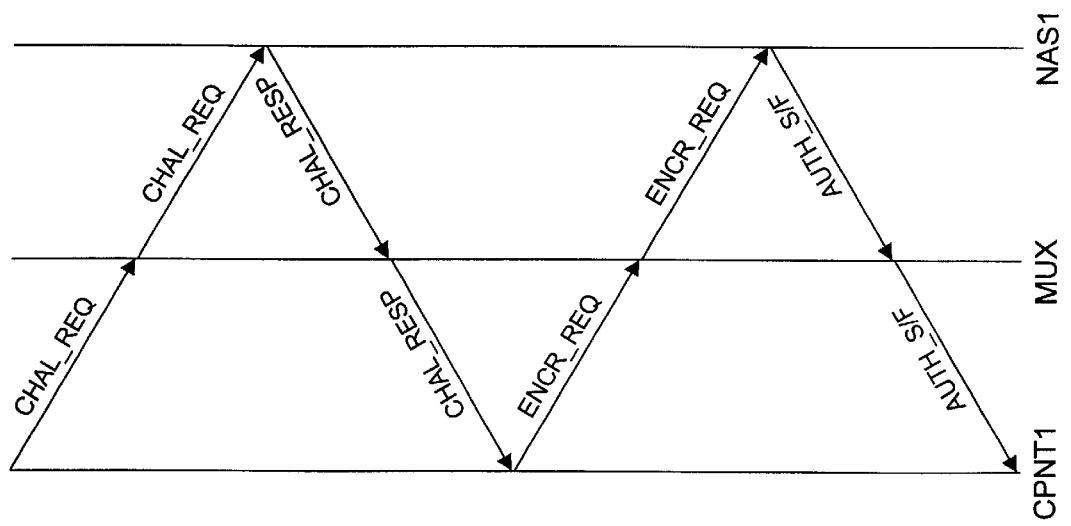
FIG. 2 is a time diagram for the transfer of label distribution protocol messages between the customer premises network termination CPNT1 ant the network access server NAS1 of FIG. 1 when a first embodiment of the end-to-end authentication method according to the present invention.
Figure 4:
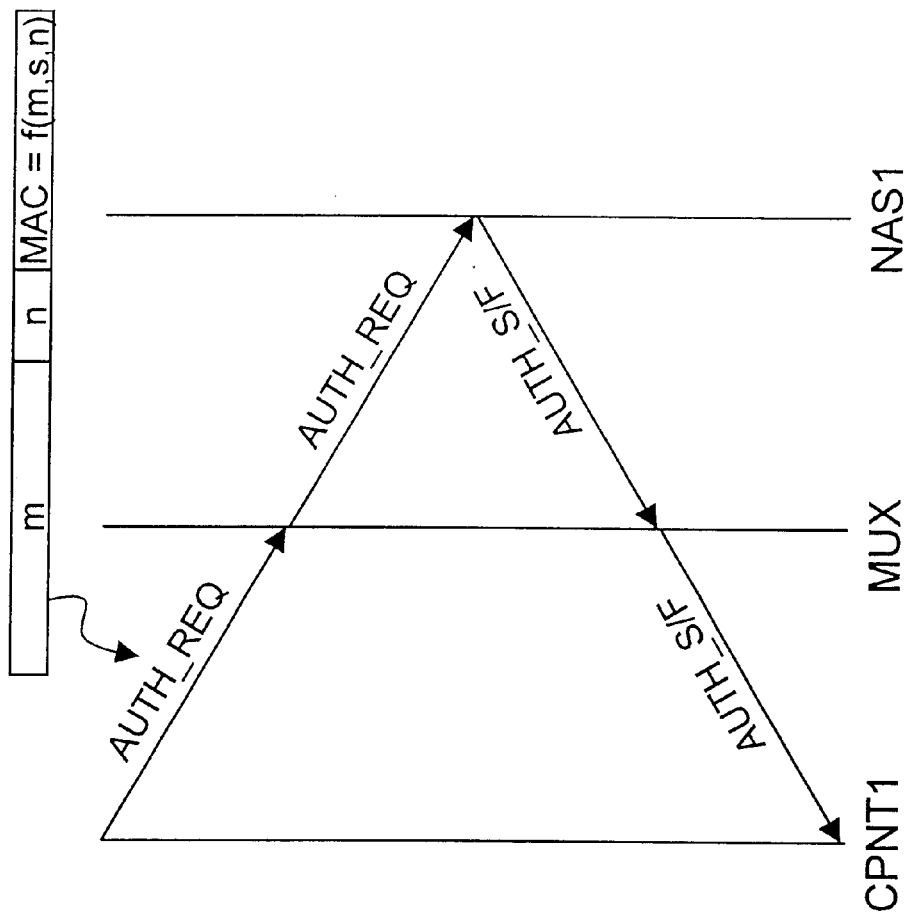
FIG. 4 is a time diagram for the transfer of label distribution protocol messages between the customer premises network termination CPNT1 and the network access server NAS1 of FIG. 1 when a third embodiment of the end-to-end authentication method according to the present invention is implemented.

If MPLS (Multi Protocol Label Switching) or another label switched path protocol is used for setting up connectivity to a service provider, the service provider will want to know who is using the label switched path in order to verify access rights and to do correct billing. This is known as end-to-end authentication between the user of the ADSL modem CPNT1 and the network access server NAS1 of the service provider that terminates the label switched path. Referring to FIG. 2, FIG. 3 and FIG. 4, the following paragraphs will describe three strategies to implement end-to-end authentication over the LDP (Label Distribution Protocol) signalling channels of the network drawn in FIG. 1 so that no additional protocol with end-to-end authentication functionality such as PPP (Point-to-Point Protocol) has to be carried over MPLS.

Referring to FIG. 2, PPP (Point to Point Protocol) CHAP (Challenge Handshake Protocol) information is encapsulated in a number of LDP (Label Distribution Protocol) messages shared between the ADSL modem CPNT1 and the network access server NAS1 in accordance with the drawn time diagram. The ADSL modem CPNT1 after being configured, requests to set up a label switched path towards network access server NAS1 by sending a challenge request message CHAL_REQ to network access server NAS1. This challenge request message CHAL_REQ is a traditional LDP (Label Distribution Protocol) request message containing information required to set up the path such as an identification of the destination of the path, i.e. an identification of network access server NAS1. The challenge request message CHAL_REQ is transparently transferred by the access multiplexer MUX. Upon receipt of the challenge request message CHAL_REQ, network access server NAS1 discovers that the ADSL modem CPNT1 is not yet authenticated. Network access server NAS1 therefor sends back a challenge response message CHAL_RESP notifying the ADSL modem CPNT1 that end-to-end authentication has to be achieved before the requested label switched path can be set up. The challenge response message CHAL_RESP, which is an LDP (Label Distribution Protocol) message whose type-field indicates that this is a challenge response message, further contains a challenge code which is a by the network access server NAS1 randomly determined number or digit sequence. Also the challenge response message CHAL_RESP is transparently transferred by the access multiplexer MUX. The ADSL modem CPNT1, upon receipt of the challenge response message CHAL_RESP, encrypts the challenge code that it subtracts from the challenge response message CHAL_RESP. A one way encryption scheme such as MD5 or DES (Data Encryption Standard) may be used for instance to generate an encrypted version of the challenge code. This encrypted version of the challenge code is encapsulated in a new LDP (Label Distribution Protocol) message: the encrypted challenge request message ENCR_REQ. The encrypted challenge request message ENCR_REQ is transferred transparently by the access multiplexer MUX and in addition to the encrypted challenge code contains the authenticee's name, i.e. a username of the user at the customer premises. This username has been obtained offline from the Internet service provider ISP and will enable the network access server NAS1 to use the right password to encrypt the challenge code that the network access server NAS1 has encapsulated in the challenge response message CHAL_RESP and to compare this self-encrypted challenge code with the encrypted challenge code that the network access server NAS1 retrieves from the encrypted challenge request message ENCR_REQ. If the self-encrypted challenge code and the encrypted challenge code in the encrypted challenge request message ENCR_REQ match, the network access server NAS1 notifies in an authentication success/failure message AUTH_S/F to the ADSL modem CPNT1 that end-to-end authentication is performed successfully. The network access server NAS1 also encapsulates an identifier of the label switched path to be used in the authentication success/failure message AUTH_S/F. The just mentioned identifier of the label switched path to be used will be monitored by the access multiplexer MUX and is used thereby to correctly switch the information that will be transferred between the ADSL modem CPNT1 and the network access server NAS1. The authentication success/failure message can be a traditional LDP (Label Distribution Protocol) MAP message in case of successful end-to-end authentication. In case the self-encrypted challenge code does not match with the encrypted challenge code in the encrypted challenge request message ENCR_REQ, the network access server NAS1 notifies to the ADSL modem CPNT1 that end-to-end authentication failed. The authentication success/failure message AUTH_S/F in this case becomes an LDP (Label Distribution Protocol) notification message with an appropriate type indicator.

It is noticed that instead of piggybacking the PPP CHAP (Challenge Handshake Protocol) information on the LDP (Label Distribution Protocol) channels, a one time password could be used. Such an end-to-end authentication scheme would rely on a unique identifier within the customer premises network termination CPNT1, and a clock running synchronously with a clock in the network access server NAS1. A password would then be generated based on this unique identifier and the current time. This scheme would require secure clock synchronisation. Alternatively, the customer premises network termination and the network access server clocks could run unsynchronised, but then, the identifier would only be valid for a limited time, typically 2 years.

Another implementation of end-to-end authentication between the ADSL modem CPNT1 and the network access server NAS1 of FIG. 1 is illustrated by FIG. 3. This implementation is based on the use of a public/private key pair, digital certificates and digital signatures. A public/private key pair consists of a public key that is maintained in a database of the certification authority and that may be known by everyone, and a private key associated with the public key and known by the user only. A digital certificate is an object containing the public key and a user identity. The public/private key pair and the digital certificate are assigned to a user by a trusted authority, for instance the operator of the access network drawn in FIG. 1. When a message is transferred, a digital signature can be added to this message. Such a digital signature consists of a hash value (obtained by applying a hash function on the message content) encrypted using the private key. The request message SIGN_REQ of FIG. 3 is such a message, containing a request from the ADSL modem CPNT1 to set up a label switched path towards the network access server NAS1, the user identity, and a digital signature. The digital signature can be decrypted by the network access server NAS1 using the public key. The network access server retrieves this public key from the trusted authority using the user's identity. Successful decryption of the digital signature encapsulated in the request message SIGN_REQ proves the sender's identity and message integrity. Upon successful end-to-end authentication, the network access server NAS1 sends an authentication success/failure message AUTH_S/F to the ADSL modem CPNT1 indicating that end-to-end authentication is performed successfully and containing an identifier of the label switched path to be used. This authentication success/failure message AUTH_S/F is an LDP (Label Distribution Protocol) MAP message that is monitored by the access multiplexer MUX before it is forwarded to the ADSL modem CPNT1. The access multiplexer MUX uses the identifier of the label switched path in the authentication success/failure message AUTH_S/F to correctly switch the information that will be shared between the ADSL modem CPNT1 and the network access server NAS1. In case the digital signature in the request message SIGN_REQ cannot be successfully decrypted by the network access server NAS1, this network access server sends an authentication success/failure message AUTH_S/F to the ADSL modem CPNT1 indicating that end-to-end authentication failed. This authentication success/failure is an LDP (Label Distribution Protocol) notification message carrying an appropriate type identifier.

It is noticed that the just described end-to-end authentication scheme based on digital certificates and digital signatures is applicable to both CPNT1 to NAS1 authentication and NAS1 to CPNT1 authentication. Moreover, it can be used by the label switch routers LSR1, LSR2, LSR3 and LSR4 to verify the authenticity of label release and label withdraw messages.

Yet another implementation of end-to-end authentication between the ADSL modem CPNT1 and the network access server NAS1 of FIG. 1 is illustrated by FIG. 4. This implementation is the more bandwidth efficient than the above described first implementation which means that in comparison to the above described implementation, the bandwidth on the signaling channels occupied by authentication information is reduced. This is so because the challenge request message CHAL_REQ and challenge response message CHAL_RESP for instance needlessly occupy bandwidth on the signaling channels. The ADSL modem CPNT1 generates an authentication request AUTH_REQ, which is an LDP message containing a certain contents m, a nonce n and a message authentication code MAC. The nonce n is a unique value such as a time stamp that avoids that the message is captured and later on used by a violating person. The message authentication code MAC is a code that authenticates the client and that is based on the contents m, the nonce n and a secret s shared between the client and the service provider. This secret s for instance may be a pre-configured secret code. Upon receipt of the authentication request AUTH_REQ, the network access server NAS1 generates a message authentication code and compares this locally generated message authentication code with the message authentication code MAC contained in the authentication request AUTH_REQ. For the locally generated message authentication code, the network access server NAS1 uses the contents m of the received authentication request AUTH_REQ, the nonce n of the received authentication request AUTH_REQ, and the shared secret s. If the locally generated message authentication code and the message authentication code MAC in the authentication request AUTH_REQ match, the network access server NAS1 notifies in an authentication success/failure message AUTH_S/F to the ADSL modem CPNT1 that end-to-end authentication is performed successfully. The network access server NAS1 then encapsulates an identifier of the label switched path to be used in the authentication success/failure message AUTH_S/F. The just mentioned identifier of the label switched path to be used will be monitored by the access multiplexer MUX and is used thereby to correctly switch the information that will be transferred between the ADSL modem CPNT1 and the network access server NAS1. The authentication success/failure message can be a traditional LDP (Label Distribution Protocol) MAP message in case of successful end-to-end authentication. In case the locally generated message authentication code does not match with the message authentication code MAC in the authentication request AUTH_REQ, the network access server NAS1 notifies to the ADSL modem CPNT1 that end-to-end authentication failed. The authentication success/failure message AUTH_S/F in this case becomes an LDP (Label Distribution Protocol) notification message with an appropriate type indicator.

It is remarked that embodiments of the present invention were described above rather in functional terms. From this functional description it will be obvious for a person skilled in the art of designing electronic devices and software development how the embodiments can be manufactured with wellknown electronic components and/or software modules.

While the principles of the invention have been described above in connection with specific apparatus, it is to be clearly understood that this description is made only by way of example and not as a limitation on the scope of the invention.

What is claimed is:

1. Method to perform end-to-end authentication between a customer premises network termination (CPNT1) of a user and a network access server (NAS1) of a service provider at set-up of a label switched connection in a label switched data packet system, CHARACTERIZED IN THAT end-to-end authentication information is transported over label distribution signaling channels.

2. Method according to claim 1,

CHARACTERIZED IN THAT said label switched data packet system is a Multi Protocol Label Switching (MPLS) based broadband access network, and said authentication information is transported via Label Distribution Protocol (LDP) channels.

3. Method according to claim 1 or claim 2,

CHARACTERIZED IN THAT said authentication information comprises a challenge request message (CHAL_REQ) encapsulating a request to set-up a label switched path between said customer premises network termination (CPNT1) and said network access server (NAS1), a challenge response message (CHAL_RESP) encapsulating a challenge code determined by said network access server (NAS1), an encrypted challenge request message (ENCR_REQ) encapsulating an encrypted version of said challenge code, and an authentication success/failure message (AUTH_S/F) encapsulating an indication that end-to-end authentication between said customer premises network termination (CPNT1) and said network access server (NAS1) is performed successfully or has failed.

4. Method according to claim 1, CHARACTERISED IN THAT said authentication information comprises a request message encapsulating a user identity and a digital signature consisting of a secure hash value encrypted using a private key known by said user only, signed by a trusted authority and connected to a public key, and an authentication success/ failure message (AUTH_S/F) encapsulating an indication that end-to-end authentication between said customer premises network termination (CPNT1) and said network access server (NAS1) is performed successfully or has failed.

5. Method according to claim 1,
CHARACTERISED IN THAT said authentication information comprises an authentication request (AUTH_REQ) encapsulating a unique value such as a time stamp (n) and a message authentication code (MAC) based on said unique value (n) and a secret (s) shared between said user and said service provider, and an authentication success/failure message (AUTH_S/F) encapsulating an indication that end-to-end authentication between said customer premises network termination (CPNT1) and said network access server (NAS1) is performed successfully or has failed.

6. Customer premises network termination (CPNT1) for a label switched data packet system,
CHARACTERISED IN THAT said customer premises network termination (CPNT1) is adapted to perform end-to-end authentication with a network access server (NAS1) via label distribution signaling channels.

7. Customer premises network termination (CPNT1) according to claim 6,
CHARACTERISED IN THAT said customer premises network termination (CPNT1) comprises:
a. means for generating and sending a challenge request message (CHAL_REQ) encapsulating a request to set-up a label switched path between said customer premises network termination (CPNT1) and said network access server (NAS1);
b. means for receiving and interpreting a challenge response message (CHAL_RESP) encapsulating a challenge code determined by said network access server (NAS1);
c. means for encrypting said challenge code to thereby generate an encrypted version of said challenge code;
d. means for generating and sending an encrypted challenge request message (ENCR_REQ) encapsulating said encrypted version of said challenge code; and
e. means for receiving and interpreting an authentication success/failure message (AUTH_S/F) encapsulating an indication that end-to-end authentication between said customer premises network termination (CPNT1) and said network access server (NAS1) is performed successfully or has failed.

8. Customer premises network termination (CPNT1) according to claim 6,
CHARACTERISED IN THAT said customer premises network termination (CPNT1) comprises:
a. means for generating and sending a request message encapsulating a user identity and a digital signature consisting of a secure hash value encrypted using a private key known by said user only, signed by a trusted authority and connected to a public key; and
b. means for receiving and interpreting an authentication success/failure message (AUTH_S/F) encapsulating an indication that end-to-end authentication between said customer premises network termination (CPNT1) and said network access server (NAS1) is performed successfully or has failed.

9. Customer premises network termination (CPNT1) according to claim 6,
CHARACTERISED IN THAT said customer premises network termination (CPNT1) comprises:

a. means for generating and sending an authentication request (AUTH_REQ) encapsulating a unique value such as a time stamp (n), and a message authentication code (MAC) based on said unique value (n) and a secret (s) shared between a user of said customer premises network termination (CPNT1) and a service provider operating said network access server (NAS1), said message authentication code (MAC) to be compared in said network access server (NAS1) with a locally generated message authentication code based on said unique value (n) in said authentication request (AUTH_REQ) and said secret (s); and
b. means for receiving and interpreting an authentication success/failure message (AUTH_S/F) encapsulating an indication that end-to-end authentication between said customer premises network termination (CPNT1) and said network access server (NAS1) is performed successfully or has failed.

10. Network access server (NAS1) for a label switched data packet system,
CHARACTERISED IN THAT said network access server (NAS1) is adapted to perform end-to-end authentication with a customer premises network termination (CPNT1) via label distribution signaling channels.

11. Network access server (NAS1) according to claim 10,
CHARACTERISED IN THAT said network access server (NAS1) comprises:
a. means for receiving and interpreting a challenge request message (CHAL_REQ) encapsulating a request to set-up a label switched path between said customer premises network termination (CPNT1) and said network access server (NAS1);
b. means for generating and sending a challenge response message (CHAL_RESP) encapsulating a challenge code determined by said network access server (NAS1);
c. means for receiving and interpreting an encrypted challenge request message (ENCR_REQ) encapsulating an encrypted version of said challenge code;
d. means for comparing said challenge code with said encrypted version of said challenge code; and
e. means for generating and sending an authentication success/failure message (AUTH_S/F) encapsulating an indication that end-to-end authentication between said customer premises network termination (CPNT1) and said network access server (NAS1) is performed successfully or has failed.

12. Network access server (NAS1) according to claim 10,
CHARACTERISED IN THAT said network access server (NAS1) comprises:
a. means for receiving and interpreting a request message encapsulating a user identity and a digital signature consisting of a secure hash value encrypted using a private key known by said user only, signed by a trusted authority and connected to a public key;
b. means for decrypting said digital signature using said public key; and
c. means for generating and sending an authentication success/failure message (AUTH_S/F) encapsulating an indication that end-to-end authentication between said customer premises network termination (CPNT1) and said network access server (NAS1) is performed successfully or has failed.

13. Network access server (NAS1) according to claim 10,
CHARACTERISED IN THAT said network access server (NAS1) comprises:

a. means for receiving and interpreting an authentication request (AUTH_REQ) encapsulating a unique value such as a time stamp (n), and a message authentication code (MAC) based on said unique value (n) and a secret (s) shared between a user of said customer premises network termination (CPNT1) and a service provider operating said network access server (NAS1);

b. means for comparing said message authentication code (MAC) with a locally generated message authentication code based on said unique value (n) in said authentication request (AUTH_REQ) and said secret (s); and c. means for generating and sending an authentication success/failure message (AUTH_S/F) encapsulating an indication that end-to-end authentication between said customer premises network termination (CPNT1) and said network access server (NAS1) is performed successfully or has failed.

* * * * *